(No Model.) 2 Sheets—Sheet 1.

W. HILLMAN.
APPARATUS FOR MOLDING GOLF BALLS.

No. 548,546. Patented Oct. 22, 1895.

Witnesses.
Walter E. Allen.
James W. White.

Inventor.
William Hillman.
By Knight Bros
Attorneys.

(No Model.)   2 Sheets—Sheet 2.

W. HILLMAN.
APPARATUS FOR MOLDING GOLF BALLS.

No. 548,546.   Patented Oct. 22, 1895.

Witnesses:
Walter E. Allen.
Jas. W. White.

Inventor:
William Hillman.
Knight Bros.
Attorneys.

UNITED STATES PATENT OFFICE.

WILLIAM HILLMAN, OF COVENTRY, ENGLAND.

APPARATUS FOR MOLDING GOLF-BALLS.

SPECIFICATION forming part of Letters Patent No. 548,546, dated October 22, 1895.

Application filed April 20, 1895. Serial No. 546,536. (No model.)

*To all whom it may concern:*

Be it known that I, WILLIAM HILLMAN, a subject of the Queen of Great Britain, residing at Coventry, in the county of Warwick, England, have invented certain new and useful Improvements in the Manufacture of Golf-Balls and in Apparatus Employed Therein, of which the following is a specification.

The invention relates to improvements in the manufacture of golf-balls and in apparatus employed therein.

I will describe my invention with reference to the accompanying drawings, in which—

Figure 1:
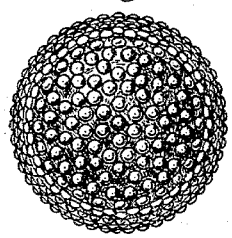
Figure 2:
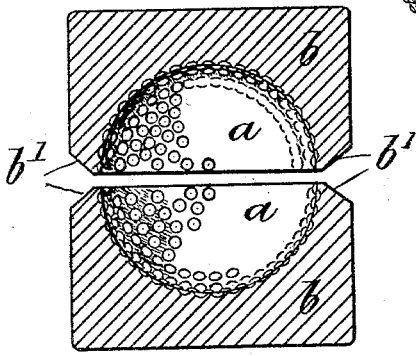
Figure 4:
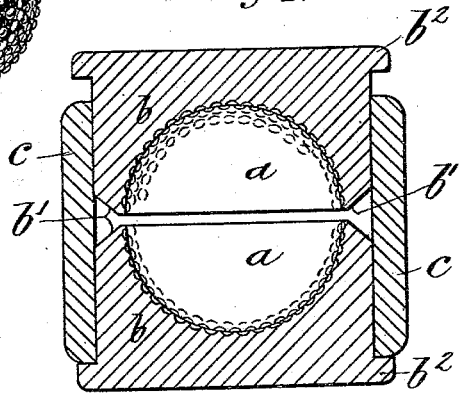
Figure 3:
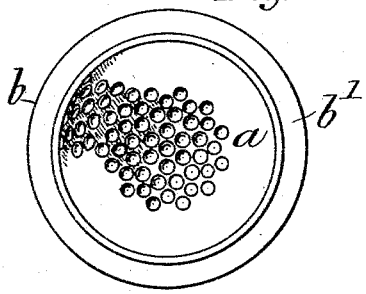
Figure 5:
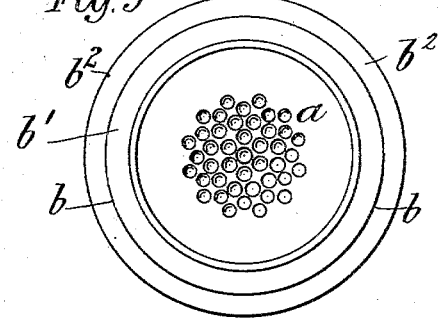
Figure 6:
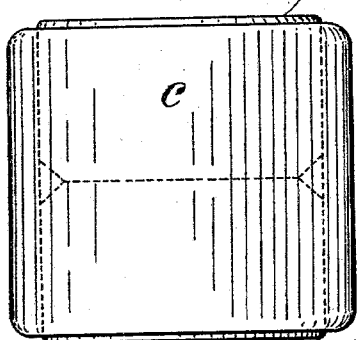
Figure 7:
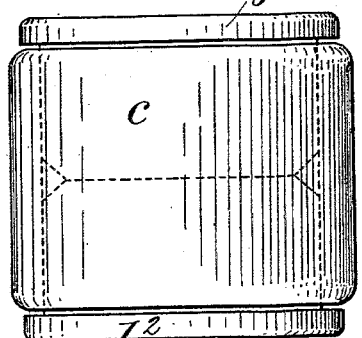
Figure 8:
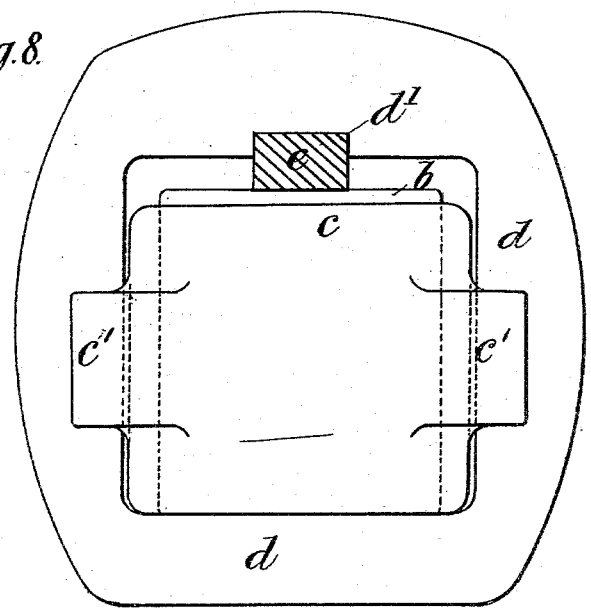
Figure 9:
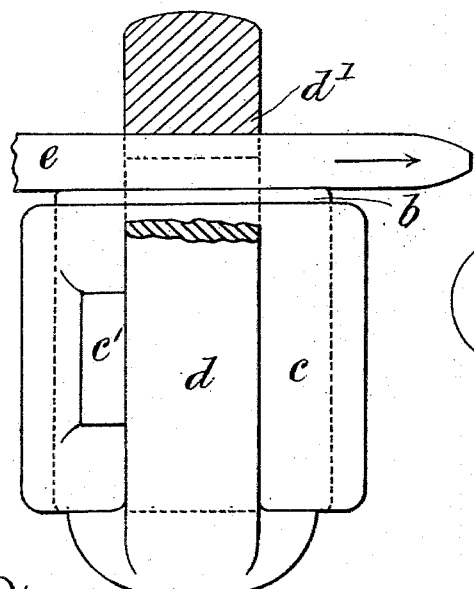
Figure 10:
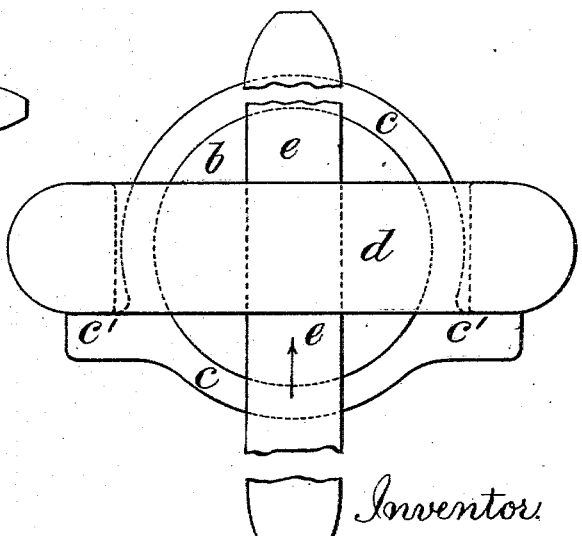

Figure 1 is a view of my improved golf-ball. Fig. 2 is a sectional view of the mold used to produce the same. Fig. 3 is a plan or face view of one part of the mold shown in Fig. 2. Fig. 4 is a section of another form of mold, showing a closely-fitting guiding ring or cylinder around the two parts thereof. Fig. 5 is a face view of one part of the mold shown in Fig. 4. Figs. 6 and 7 are exterior views of the molds shown at Figs. 2 and 4, respectively, when placed within the closely-fitting guiding rings or cylinders. Figs. 8 and 9 are two views, partly in section, taken at right angles to each other, showing a form of apparatus suitable for making golf-balls at home; and Fig. 10 is a plan of the same.

Heretofore golf-balls have been marked with grooves in various directions across and around the same. This method of marking, however, necessitates the employment of very expensive molds or dies in the manufacture thereof, except when using roughly-made molds or dies.

According to my invention instead of marking such balls with lines, as heretofore, I mark them all over with small, segmental, spherical, or rounded projections, as shown at Fig. 1, which enables me to employ in the production thereof molds or dies which are comparatively inexpensive to produce.

It is evident that the invention may be modified by making the projections above referred to of a conical or of partly-cylindrical and partly-conical form.

In the production of this class of mold I first turn two hollow hemispheres $a$ in blocks of metal $b$, the edges $b'$ of which are chamfered off, so as to produce a sharp or nearly-cutting meeting edge to each of such blocks $b$. I also by the aid of a spherical milling-tool or by a twisted or plain drill or bit having its end of the required form mill out over the whole of the interior surface of such hemispheres $a$ a number of segmental, spherical, or rounded or other shaped recesses in any desired order and distance from each other, and I turn the exterior of such blocks cylindrically for a certain distance from the meeting edges and form a flange or annular projection or seat $b^2$ at the bottom of such cylindrical part, as shown in Figs. 4, 5, and 7. I fit around the cylindrical parts of such blocks a closely-fitting guiding ring or cylinder $c$, which is somewhat shorter than the distance between the two flanges $b^2$ when the meeting edges $b'$ of the two half-molds or die-blocks $b$ are in contact. Such ring or cylinder $c$ acts as a guide to cause the two half-molds or die-blocks $b$ to approach each other truly when forced together. In the manufacture of golf-balls by the said mold or dies I first soften the ball material (generally gutta-percha) and place a suitable quantity to form a ball within one of the half dies or molds $b$ with the movable ring or cylinder $c$ around the cylindrical part thereof. I then force the other half die or mold down upon the same until the meeting edges of the two half molds or dies $b$ touch each other, when the excess material will pass out between the chamfered edges $b'$ and will be so thin at its junction with the ball as to be readily removed after the ball is taken out from the molds or dies $b$.

By the employment of the loose ring or cylinder $c$ and the chamfered edges $b'$ of the molds or dies I am enabled to dispense with the cross-cuts usually employed in the edge of one of the dies for the escape of the surplus material, and by the removal of the ring or cylinder $c$ I am enabled readily to take the ball out of the molds or dies by gripping the projecting fin of material produced between the chamfered meeting edges of the dies or molds $b$.

Dies or molds of the above character can be used in ordinary presses when commercially making such balls; but for home use the dies or molds $b$ and ring or cylinder $c$ may, according to my invention, when placed together with the plastic material inclosed therein, be placed in a clamp $d$, as shown in Figs.

8, 9, and 10, formed to receive the combined molds or dies *b* and ring or cylinder *c* and support the same on the sides, back, and bottom, and having a keyway *d'* formed in the top to receive a key or wedge *e*, which when driven between the upper mold or die and the upper part or bar of the clamp will force the two parts of the mold or die together until their meeting edges touch each other, after which the key or wedge is driven out and the ball removed from the molds or dies *b*.

When using the clamp *d*, the ring or cylinder *c* is formed with two lugs or projections *c'*, which rest against the sides of the clamp and prevent the ring or cylinder *c* and molds *b* moving when the wedge *e* is being driven in by a hammer.

I have found in practice that the molds or dies *b* may be formed, as shown in Figs. 2, 3, 6, 8, 9, and 10, without any flange or annular projection $b^2$.

Having fully described my invention, what I desire to claim and secure by Letters Patent is—

An apparatus for the manufacture of golf balls, consisting of two blocks or dies the interior surfaces of which have segmental spherical or rounded recesses and guided in a ring or cylinder having two lugs or projections, said ring or cylinder fitting within a clamp having a key-way formed therein to receive a key or wedge, which, when driven between the upper block or die and the clamp, will force the two parts of the mold or die together, substantially as herein shown and described.

WILLIAM HILLMAN.

Witnesses:
W. R. GOATE,
F. A. HULBERT.